US012621652B2

(12) United States Patent
Chung et al.

(10) Patent No.: US 12,621,652 B2
(45) Date of Patent: May 5, 2026

(54) METHOD AND APPARATUS FOR MANAGING eSIM PROFILES

(71) Applicant: ELECTRONICS AND TELECOMMUNICATIONS RESEARCH INSTITUTE, Daejeon (KR)

(72) Inventors: Bo-Heung Chung, Daejeon (KR); You-Sung Kang, Daejeon (KR); Keon-Woo Kim, Daejeon (KR); Byoung-Koo Kim, Daejeon (KR); Tae-Sung Kim, Daejeon (KR); Seung-Yong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 18/521,955

(22) Filed: Nov. 28, 2023

(65) Prior Publication Data

US 2024/0236646 A1      Jul. 11, 2024

(30) Foreign Application Priority Data

Jan. 6, 2023      (KR) ......................... 10-2023-0002311

(51) Int. Cl.
*H04W 4/50* (2018.01)
*H04W 8/20* (2009.01)
*H04W 12/03* (2021.01)
*H04W 12/30* (2021.01)

(52) U.S. Cl.
CPC ............. *H04W 8/205* (2013.01); *H04W 4/50* (2018.02); *H04W 12/03* (2021.01); *H04W 12/35* (2021.01)

(58) Field of Classification Search
CPC ..... H04W 8/205; H04W 8/183; H04W 12/04; H04W 12/03; H04W 12/35
See application file for complete search history.

(56) References Cited

U.S. PATENT DOCUMENTS

| | | | |
|---|---|---|---|
| 9,503,454 | B2 | 11/2016 | Jung et al. |
| 10,470,016 | B2 | 11/2019 | Yerrabommanahalli et al. |
| 11,197,161 | B2 | 12/2021 | Chadwick et al. |
| 11,374,926 | B2 | 6/2022 | Li et al. |
| 11,570,611 | B2 | 1/2023 | Mun et al. |
| 2014/0337551 | A1 | 11/2014 | Cho |
| 2018/0294949 | A1* | 10/2018 | Yang ................... H04W 12/106 |
| 2018/0367984 | A1 | 12/2018 | Park et al. |
| 2020/0228962 | A1 | 7/2020 | Park et al. |

(Continued)

FOREIGN PATENT DOCUMENTS

| | | |
|---|---|---|
| JP | 2014222870 A1 | 11/2014 |
| KR | 1020170136603 A | 12/2017 |

(Continued)

*Primary Examiner* — William G Trost, IV
(74) *Attorney, Agent, or Firm* — Rabin & Berdo, P.C.

(57) ABSTRACT

Disclosed herein is a method for managing an embedded Subscriber Identity Module (eSIM) profile. The method may include installing a common profile in multiple devices to perform provisioning, selecting a representative device from among the multiple devices, establishing a communication channel in the representative device, receiving, by the representative device, profile information for the multiple devices from a server, and transferring, by the representative device, the profile information to the respective devices.

18 Claims, 5 Drawing Sheets

(56) References Cited

U.S. PATENT DOCUMENTS

| | | | | |
|---|---|---|---|---|
| 2020/0359212 A1* | 11/2020 | Chen | .................... | H04L 63/102 |
| 2021/0250750 A1* | 8/2021 | Higgins | ................. | H04W 8/22 |
| 2022/0400051 A1 | 12/2022 | Park et al. | | |
| 2024/0022900 A1* | 1/2024 | Somasekhar | ......... | H04W 8/205 |

FOREIGN PATENT DOCUMENTS

| | | | |
|---|---|---|---|
| KR | 1020180032633 A | 3/2018 |
| KR | 1020200017180 A | 2/2020 |
| KR | 1020210123269 A | 10/2021 |
| KR | 102416623 B1 | 7/2022 |

* cited by examiner

METHOD AND APPARATUS FOR MANAGING eSIM PROFILES

CROSS REFERENCE TO RELATED APPLICATION

This application claims the benefit of Korean Patent Application No. 10-2023-0002311, filed on Jan. 6, 2023, which is hereby incorporated by reference in its entirety into this application.

BACKGROUND OF THE INVENTION

1. Technical Field

The present disclosure relates to technology for effectively managing embedded Subscriber Identity Module (eSIM) profiles in order to support network connectivity of devices with eSIMs operated using a Machine-to-Machine (M2M) communication method.

2. Description of the Related Art

These days, the move to connect and use devices over a network and to thereby provide various services, such as connected cars, carsharing, drones, and smart mirroring services, is rapidly increasing. In this case, Subscriber Identification Module (SIM) or Universal Subscriber Identification Module (USIM) cards in the form of hardware cards are used for the purposes of device identification over the network, billing, and the like.

However, it is difficult to use such cards in a detachable manner in devices used for the above-mentioned services. Accordingly, embedded universal IC cards (eUICCs) or embedded Subscriber Identity Modules (eSIMs), which are not removable by users, are provided, whereby it becomes possible to subscribe to, change, or cancel a mobile communication service via an Over-The-Air (OTA) method.

Users download and install subscriber profiles in eSIMs via the OTA method by accessing a provider's network that they want to use. Here, a procedure of downloading the subscriber profile and installing the same in the eSIM is referred to as 'provisioning'.

In conventional provisioning management methods, provisioning is sequentially performed on multiple devices, whereby significant amounts of installation time and cost are consumed.

Furthermore, when there is a need to replace or exchange an existing device in the process of operating the device after provisioning, it is necessary to create a new profile and perform provisioning on a new device, so significant amounts of installation time and cost are consumed.

SUMMARY OF THE INVENTION

An object of the present disclosure is to provide a method and apparatus for managing an eSIM profile in order to prevent significant amounts of installation time and cost from being consumed when provisioning is performed.

Another object of the present disclosure is to provide a method and apparatus for managing an eSIM profile in order to prevent significant amounts of installation time and cost for provisioning from being consumed when an existing device is exchanged/replaced in a process of operating the device.

In order to accomplish the above objects, a method for managing an eSIM profile according to an embodiment may include installing a common profile in multiple devices to perform provisioning, selecting a representative device from among the multiple devices, establishing a communication channel in the representative device, receiving, by the representative device, profile information for the multiple devices from a server, and transferring, by the representative device, the profile information to the respective devices.

The profile information may be transferred to the respective devices using information of the common profile.

The profile information may be encrypted or signed with a secret key of the common profile.

The server may receive information for creating a profile and create the profile using the information.

The server may include Subscription Manager Data Preparation (SM-DP) and Subscription Manager Secure Routing (SM-SR).

The SM-DP may create a profile and transfer the created profile to the SM-SR.

The SM-SR may transfer the profile to the eUICC of the representative device, and the eUICC may install the profile.

When any one of the multiple devices makes a request for a profile download to the representative device, the representative device may transfer profile information about the representative device to the device that makes the request for the profile download.

The device that makes the request for the profile download may install the profile information received from the representative device.

The device that makes the request for the profile download may transfer changed profile information to the server.

Also, in order to accomplish the above objects, an apparatus for managing an eSIM profile according to an embodiment includes memory in which a control program for managing an eSIM profile is stored and a processor for executing the control program stored in the memory. The processor may install a common profile in multiple devices to perform provisioning, select a representative device from among the multiple devices, establish a communication channel in the representative device, enable the representative device to receive profile information for the multiple devices from a server, and enable the representative device to transfer the profile information to the respective devices.

The processor may transfer the profile information to the respective devices using information of the common profile.

The profile information may be encrypted or signed with a secret key of the common profile.

The processor may perform control such that the server receives information for creating a profile and creates the profile using the information.

The server may include SM-DP and SM-SR.

The processor may perform control such that the SM-DP creates a profile and transfers the created profile to the SM-SR.

The processor may perform control such that the SM-SR transfers the profile to the eUICC of the representative device and such that the eUICC installs the profile.

The processor may perform control such that, when any one of the multiple devices makes a request for a profile download to the representative device, the representative device transfers profile information about the representative device to the device that makes the request for the profile download.

The processor may perform control such that the device that makes the request for the profile download installs the profile information received from the representative device.

The processor may perform control such that the device that makes the request for the profile download transfers changed profile information to the server.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
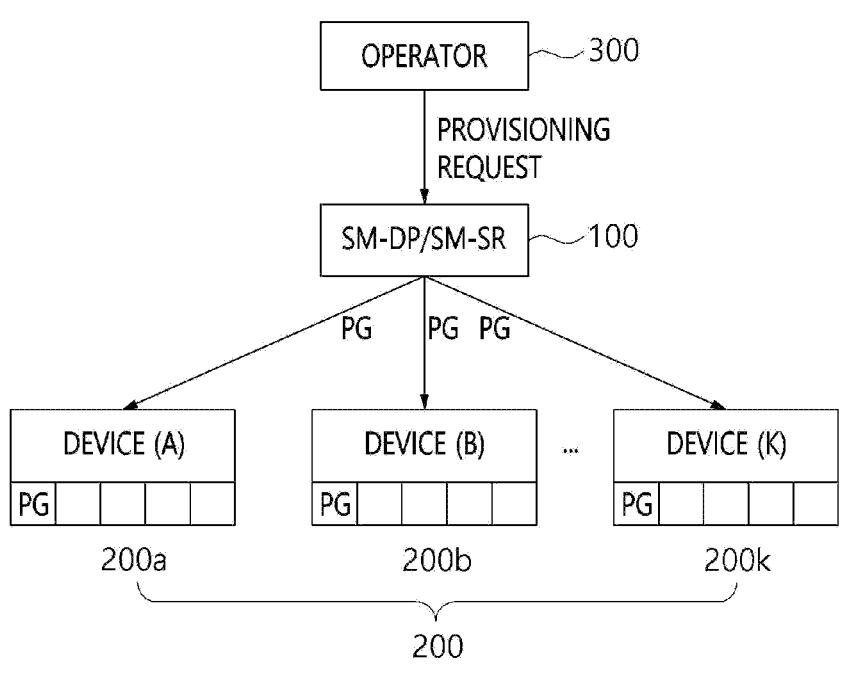
FIG. 1 is a block diagram illustrating a system for managing an eSIM profile according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

Figure 2:
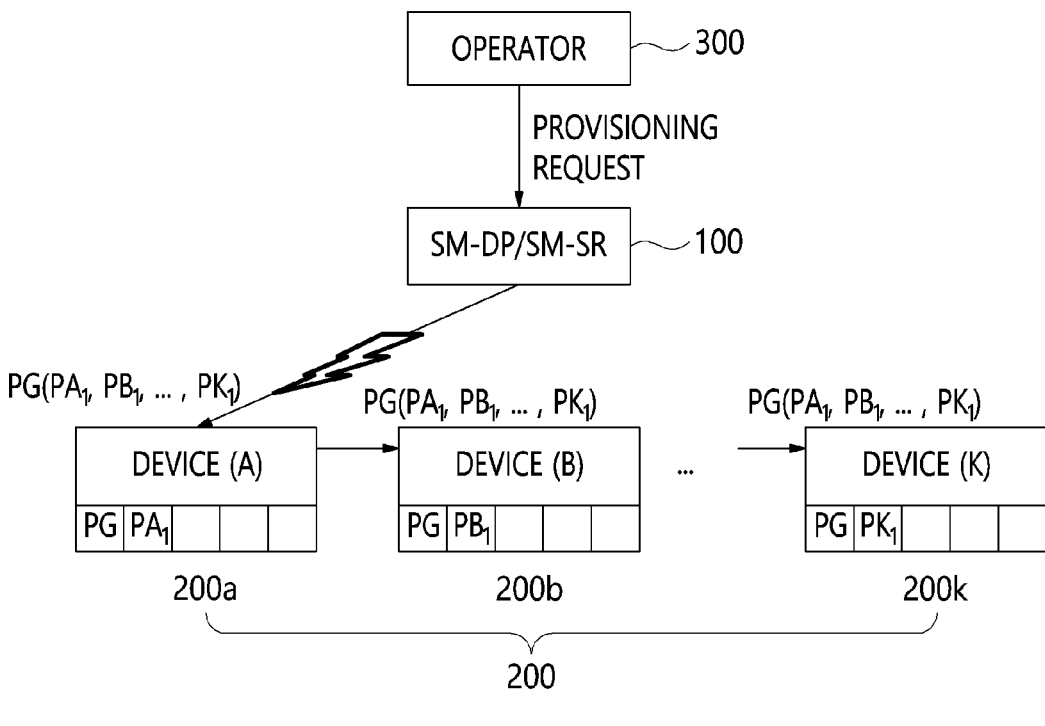
FIG. 2 is a view illustrating a provisioning operation of a system for managing an eSIM profile according to an embodiment.

FIG. 1 is a block diagram illustrating a system for managing an eSIM profile according to an embodiment, and FIG. 2 is a view illustrating a provisioning operation of a system for managing an eSIM profile according to an embodiment.

Referring to FIG. 1, the system for managing an eSIM profile according to an embodiment may include a server 100 and multiple devices 200.

The server 100 may provide at least one of a function of creating a profile, a function of encrypting the created profile, a function of creating an instruction for remote management of a profile, or a function of encrypting the created instruction for remote management of a profile, or a combination thereof. The server 100 is a server capable of including a function of supporting activation of multiple profiles of devices, and may be configured with at least one of Subscription Manager Data Preparation (SM-DP), Subscription Manager Data Preparation plus (SM-DP+), or Subscription Manager Secure Routing (SM-SR), or a combination thereof.

The device 200 may be a device for managing an eSIM profile. The device 200 may be, for example, a terminal. The terminal may be referred to as a Mobile Station (MS), User Equipment (UE), a User Terminal (UT), a wireless terminal, an Access Terminal (AT), a terminal, a subscriber unit, a Subscriber Station (SS), a wireless device, a wireless communication device, a Wireless Transmit/Receive Unit (WTRU), a mobile node, a mobile, or any other terms. Various embodiments of the terminal may include a cellular phone, a smartphone having a wireless communication function, a Personal Digital Assistant (PDA) having a wireless communication function, a wireless modem, a portable computer having a wireless communication function, an imaging device such as a digital camera having a wireless communication function, a gaming device having a wireless communication function, a home appliance capable of music storage and playback and having a wireless communication function, an Internet home appliance capable of wireless Internet access and browsing, and portable units or terminals in which combinations of these functions are incorporated. Also, the terminal may include a Machine-to-Machine (M2M) terminal and a Machine Type Communication (MTC) terminal/device, but is not limited thereto. In the present specification, the terminal may be referred to as an electronic device or simply referred to as a device. Also, the terminal may be used interchangeably with a modem in the present specification.

The device 200 may include software or an application installed in the terminal or device so as to control a UICC or an eUICC therein. The software or the application may be referred to as, for example, a Local Profile Assistant (LPA).

In the present specification, an eUICC identifier (eUICC ID) may be the unique identifier of the eUICC embedded in the terminal, and may be referred to as an 'EID'.

The provisioning process according to an embodiment is described below.

As illustrated in FIG. 1, when a user subscribes for a mobile communication service online or offline through an operator 300, the operator 300 may create a subscriber profile of the user and make a provisioning request to the server 100.

The server 100 provides a common profile to the devices 200, which are devices to perform provisioning, and the devices 200 may install the received common profile.

As illustrated in FIG. 2, the devices 200 may select a representative device (e.g., device A), and the representative device 200$a$ may establish a mobile communication channel in order to communicate with the server. The server 100 may transfer profiles for the remaining devices 200$b$, . . . , 200$k$ to the representative device 200$a$, and the representative device 200$a$ may transfer the profiles to the remaining devices through an internal network. The remaining devices may download and install the received profiles.

Accordingly, when the performance of the mobile communication channel is not good, an inefficient process in which all of the devices use the corresponding channel and provisioning is repeatedly performed as many times as the number of devices may be avoided.

Figure 3:
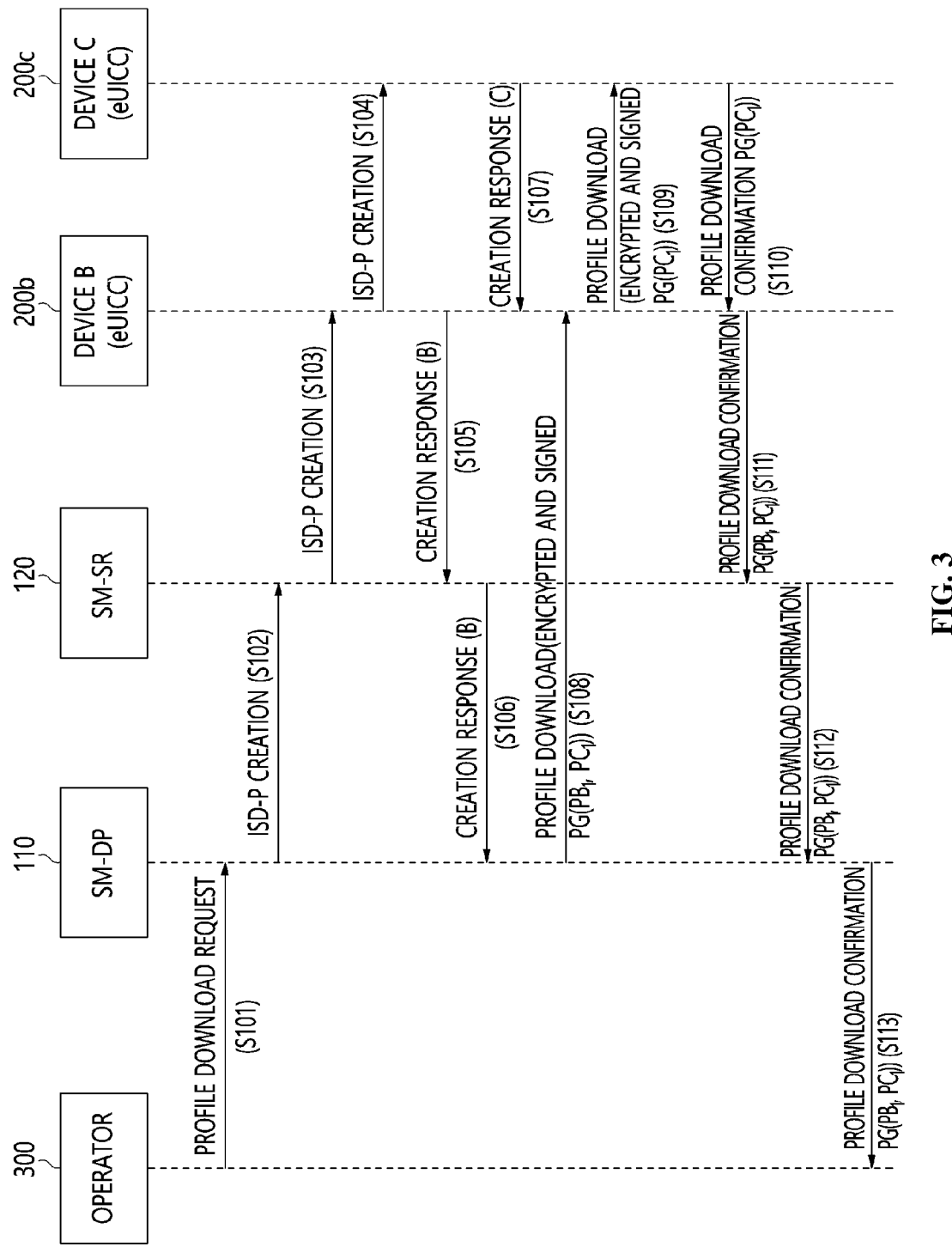
FIG. 3 is a flowchart illustrating a detailed operation of a system for managing an eSIM profile according to an embodiment.

FIG. 3 is a flowchart illustrating a detailed operation of a system for managing an eSIM profile according to an embodiment.

For convenience of description, it may be assumed that there are device B and device C and that device B is selected as a representative device.

Referring to FIG. 3, when an operator 300 requests a profile download at step S101, the SM-DP 110 of a server 100 may receive an issuer security domain profile (ISD-P) creation message and transfer the same to the SM-SR 120 of the server at step S102. The SM-SR 120 of the server may transfer the ISD-P creation message to device B 200$b$ at step S103, and device B 200$b$ may transfer the ISD-P creation message to device C 200$c$ at step S104.

Subsequently, when all of the creation responses of device B 200$b$ and device C 200$c$ are transferred to the SM-DP at steps S105, S106, and S107, the profile download may be performed at steps S108 and S109. Here, the message (or packet) transferred to device B 200$b$ contains all of the profiles of device B and device C. These two profiles may be transferred to device C in the state in which they are protected using information of a common profile. For example, because a secret key is generally included as an attribute of the common profile, the profiles may be encrypted or signed with the secret key of the common profile before being transferred to device B.

Finally, device C may transfer a profile download confirmation message to device B, the SM-SR, the SM-DP, and the operator at steps S110, S111, S112, and S113.

The provisioning method according to an embodiment has an advantage in which, after profiles are downloaded to a representative device in advance in a place with a good mobile communication environment, the representative device moves to a place with a poor mobile communication environment in which additional devices are installed, and the profiles are installed in the additional devices via an internal network or a connection interface between the devices.

Also, assuming that provisioning is intended to be performed on a large number of devices (e.g., 10000 devices), when a method of selecting 100 representative devices and placing each of the representative devices in charge of installing profiles in 100 devices subordinate thereto, rather than performing provisioning 10000 times for all of the devices, is used according to the present disclosure, installation time and cost therefor are minimized, whereby devices may be effectively managed.

Hereinafter, a provisioning process that is performed when an existing device is exchanged/replaced during operation of the device after provisioning will be described. Unlike the conventional technology, the present disclosure is configured such that the old device (device B) to be replaced transfers a profile PB$_1$ to a new device (device C) so as to be installed, without creating a new profile.

Figure 4:
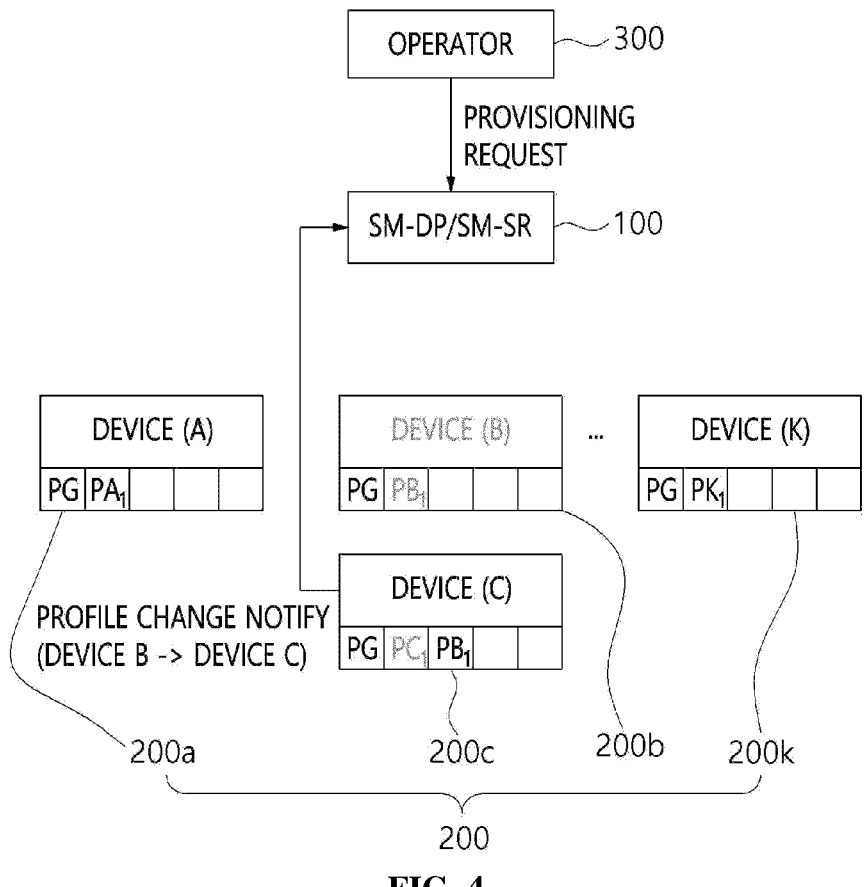
FIG. 4 is a view illustrating a provisioning operation of a system for managing an eSIM profile according to an embodiment when a device is replaced.

FIG. 4 is a view illustrating a provisioning operation of a system for managing an eSIM profile according to an embodiment when a device is replaced.

As illustrated in FIG. 4, a common profile may be installed in device B 200$b$ and device C 200$c$.

When a representative device is changed from device B 200$b$ to device C 200$c$, device B 200$b$ provides the profile thereof to device C 200$c$, and device C 200$c$ may download the profile of device B 200$b$ and install the same. Here, the attribute of the common profile described above (e.g., a secret key value) is used in order to establish a secure channel between device B 200$b$ and device C 200$c$. When the secure channel is established, device B 200$b$ transfers the profile PB$_1$ thereof to device C 200$c$. Device C 200$c$ installs the received profile and transfers the result to the server (SM-DP/SM-SR) 100, whereby the provisioning process may be completed.

Figure 5:
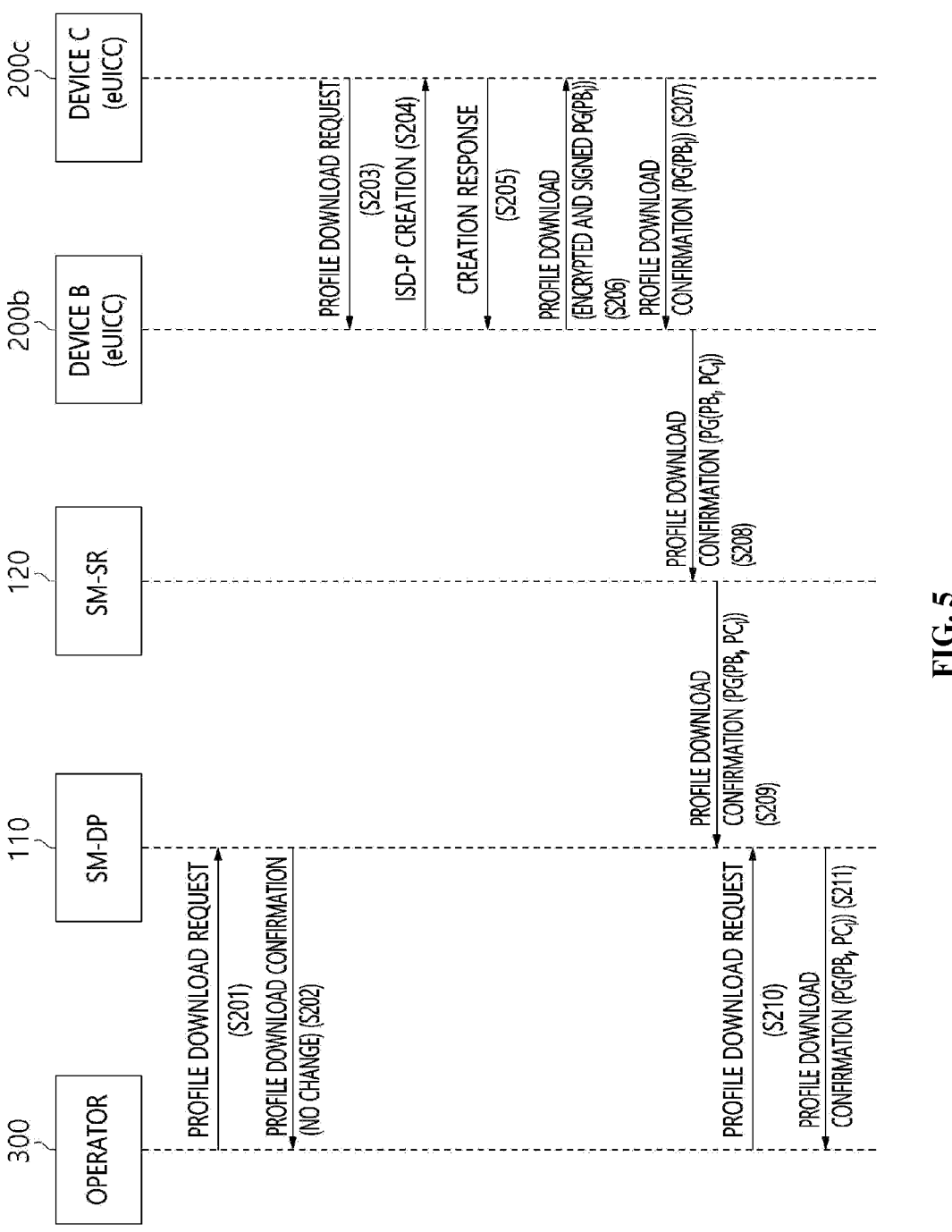
FIG. 5 is a flowchart illustrating a detailed operation of a system for managing an eSIM profile according to an embodiment when a device is replaced.

FIG. 5 is a flowchart illustrating a detailed operation of a system for managing an eSIM profile according to an embodiment when a device is replaced.

As illustrated in FIG. 5, an operator 300 may make a profile download request to SM-DP 110 at step S201. The SM-DP 110 may confirm the profile download at step S202. Here, a representative device may not be changed.

When it is necessary to replace the representative device, device C 200$c$ may transfer a profile download request to device B 200$b$ at step S203. Subsequently, device B 200$b$ confirms a response to ISD-P creation by receiving the response from device C 200$c$ at steps S204 and S205 and transfers a profile PB$_1$ to device C 200$c$ at step S206, and device C 200$c$ installs the profile. Device C 200$c$ may transfer an installation confirmation message to device B at step S207.

When the fact that installation is performed normally is transferred to device B, device B disables the transferred profile PB$_1$ in the profiles thereof and transfers the fact to the SM-SR 120 and SM-DP 110 of the server at steps S208 and S209. The SM-DP/SM-SR update the management information thereof with the received fact.

Afterward, when the operator handles a request for provisioning for the devices at step S210, the SM-DP/SM-SR transfer the fact that provisioning is completed to the operator at step S211 using the previously changed profile-related information.

The operator 300 confirms this information, thereby confirming that device B is replaced with device C and provisioning is completed normally.

When the method of an embodiment is used, provisioning of a new device does not have to be performed under the supervision of an operator, and there is an advantage in which the existing profile can be reused.

An embodiment may effectively manage an eSIM profile in order to support an on-demand network connection of a device equipped with an eSIM operated using a M2M method.

When the present disclosure is used, there are advantages and effects that flexible provisioning can be performed in a mobile network environment when a profile is downloaded and installed in a device. For example, the environment in which devices operate may be a place with a poor mobile network environment due to low-speed/narrow-bandwidth. In this case, if provisioning is performed using a conventional method, large amounts of time may be consumed, which may result in problems in which it is difficult to ensure the continuity of service or in which the initial costs for starting service increase.

However, when the method of the present disclosure is used under this condition, profiles are downloaded to a representative device in advance in a place with a good mobile communication environment, and the representative device moves to a place with a poor mobile communication environment in which additional devices are installed, so the profiles may be effectively installed in the additional devices via an internal network or a connection interface between the devices.

When the present disclosure is used, there are advantages and effects that provisioning may be quickly and effectively performed at low cost when profiles are downloaded and installed in a large number of devices. For example, when it is necessary to download and install profiles in 10000 devices, if the existing method is used, it is unavoidable to consume significant amounts of time and installation cost. However, when the method of the present disclosure is used, optimal representative devices are selected (e.g., 100 devices), and profiles may be downloaded and installed using the representative devices, whereby the installation time and cost may be minimized (reduced to $\frac{1}{100}$) in an effective manner.

Also, when the present disclosure is used, there are advantages and effects that, when replacement of a device is required during the operation, the requirement for replacement may be reflected in real time, and devices/profiles may be effectively managed. For example, when it is necessary to replace a device with a new device during operation due to a fault or deterioration of the device, the conventional method requires a process of downloading/installing a new profile to/in the new device under the supervision of an operator.

That is, provisioning of the profile on the new device is started only when the operator starts provisioning, and because it is required to issue a new profile, rather than an existing profile, it difficult to reuse the existing profile. However, according to the method of the present disclosure, when replacement with a new device is required, the old device may transfer the profile thereof to the new device so as to be reused, and provisioning is started by the new device, rather than the operator, whereby effective real-time provisioning may be performed in time for replacement with the new device.

The system for managing an eSIM profile or the apparatus for managing an eSIM profiles according to an embodiment may be implemented in a computer system including a computer-readable recording medium.

Figure 6:
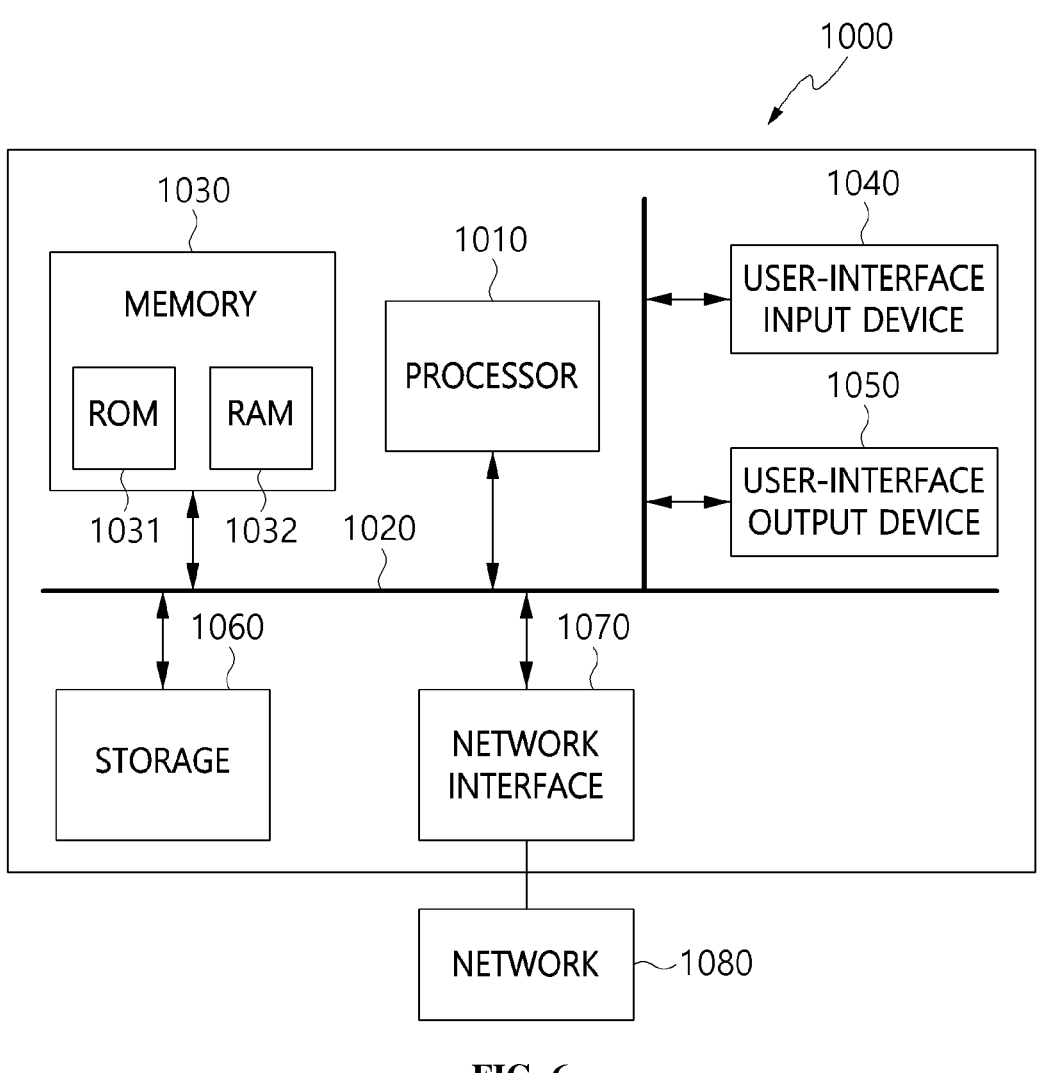
FIG. 6 is a block diagram illustrating the configuration of a computer system according to an embodiment.

FIG. 6 is a block diagram illustrating the configuration of a computer system according to an embodiment.

Referring to FIG. 6, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the system for managing an eSIM profile or the apparatus for managing an eSIM profile.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for managing an eSIM profile according to an embodiment. Specifically, the memory may store multiple applications running in the system for managing an eSIM profile or the apparatus for managing an eSIM profile and data and instructions for operation of the system for managing an eSIM profile or the apparatus for managing an eSIM profile.

The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program may contain instructions for making a processor perform a method including an operation for installing a common profile in multiple devices to perform provisioning, an operation for selecting a representative device from among the multiple devices and establishing a communication channel in the representative device, an operation for enabling the representative device to receive profile information for the multiple devices from a server, and an operation for enabling the representative device to transfer the profile information to the respective devices.

According to an embodiment, a computer program stored in the computer-readable recording medium may include instructions for making a processor perform an operation for installing a common profile in multiple devices to perform provisioning, an operation for selecting a representative device from among the multiple devices and establishing a communication channel in the representative device, an operation for enabling the representative device to receive profile information for the multiple devices from a server, and an operation for enabling the representative device to transfer the profile information to the respective devices.

An embodiment has the effect of performing flexible provisioning in a mobile network environment when a profile for a device is downloaded/installed.

Also, an embodiment has the effect of effectively and quickly performing provisioning at low cost when profiles are downloaded and installed in a large number of devices.

Also, an embodiment has the effects of reflecting a replacement requirement in real time in response to the requirement for replacement of a device during the operation and effectively managing devices/profiles.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for managing an embedded Subscriber Identity Module (eSIM) profile, comprising:
    installing a common profile in multiple devices to perform provisioning;
    selecting a representative device from among the multiple devices and establishing a communication channel in the representative device;
    receiving, by the representative device, profile information for the multiple devices from a server; and
    transferring, by the representative device, the profile information to respective devices;
    wherein, when a device of the multiple devices makes a request for a profile download to the representative device, the representative device transfers profile information about the representative device to the device that makes the request for the profile download.

2. The method of claim 1, wherein the profile information is transferred to the respective devices using information of the common profile.

3. The method of claim 2, wherein the profile information is encrypted or signed with a secret key of the common profile.

4. The method of claim 1, wherein the server receives information for creating a profile and creates the profile using the information.

5. The method of claim 1, wherein the server includes Subscription Manager Data Preparation (SM-DP) and Subscription Manager Secure Routing (SM-SR).

6. The method of claim 5, wherein the SM-DP creates a profile and transfers the created profile to the SM-SR.

7. The method of claim 6, wherein the SM-SR transfers the profile to an embedded universal IC card (eUICC) of the representative device, and the eUICC installs the profile.

8. The method of claim 1, wherein the device that makes the request for the profile download installs the profile information received from the representative device.

9. The method of claim 8, wherein the device that makes the request for the profile download transfers changed profile information to the server.

10. An apparatus for managing an embedded Subscriber Identity Module (eSIM) profile, comprising:
    memory in which a control program for managing an eSIM profile is stored; and
    a processor for executing the control program stored in the memory,
    wherein the processor installs a common profile in multiple devices to perform provisioning, selects a representative device from among the multiple devices, establishes a communication channel in the representative device, enables the representative device to receive profile information for the multiple devices from a server, and enables the representative device to transfer the profile information to respective devices;
    wherein the processor performs control such that, when a device of the multiple devices makes a request for a profile download to the representative device, the representative device transfers profile information about the representative device to the device that makes the request for the profile download.

11. The apparatus of claim 10, wherein the processor transfers the profile information to the respective devices using information of the common profile.

12. The apparatus of claim 11, wherein the profile information is encrypted or signed with a secret key of the common profile.

13. The apparatus of claim 10, wherein the processor performs control such that the server receives information for creating a profile and creates the profile using the information.

14. The apparatus of claim 10, wherein the server includes Subscription Manager Data Preparation (SM-DP) and Subscription Manager Secure Routing (SM-SR).

15. The apparatus of claim 14, wherein the processor performs control such that the SM-DP creates a profile and transfers the created profile to the SM-SR.

16. The apparatus of claim 15, wherein the processor performs control such that the SM-SR transfers the profile to an embedded universal IC card (eUICC) of the representative device and such that the eUICC installs the profile.

17. The apparatus of claim 10, wherein the processor performs control such that the device that makes the request for the profile download installs the profile information received from the representative device.

18. The apparatus of claim 17, wherein the processor performs control such that the device that makes the request for the profile download transfers changed profile information to the server.

* * * * *